(12) United States Patent
Yang

(10) Patent No.: US 11,507,319 B2
(45) Date of Patent: Nov. 22, 2022

(54) MEMORY CONTROLLER HAVING A PLURALITY OF CONTROL MODULES AND ASSOCIATED SERVER

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/167,099

(22) Filed: Feb. 4, 2021

(65) Prior Publication Data

US 2022/0244886 A1 Aug. 4, 2022

(51) Int. Cl.
*G06F 3/06* (2006.01)
*G06F 12/02* (2006.01)

(52) U.S. Cl.
CPC ............ *G06F 3/0659* (2013.01); *G06F 3/064* (2013.01); *G06F 3/0616* (2013.01); *G06F 3/0679* (2013.01); *G06F 12/0238* (2013.01); *G06F 12/0253* (2013.01)

(58) Field of Classification Search
CPC ...... G06F 3/0659; G06F 3/0616; G06F 3/064; G06F 3/0679; G06F 12/0238; G06F 12/0253
See application file for complete search history.

(56) References Cited

U.S. PATENT DOCUMENTS

| | | | | |
|---|---|---|---|---|
| 2011/0060927 | A1* | 3/2011 | Fillingim | G06F 11/1441 713/320 |
| 2016/0110249 | A1* | 4/2016 | Orme | G06F 11/1016 714/6.24 |
| 2016/0118132 | A1* | 4/2016 | Prins | G11C 16/3431 714/704 |
| 2018/0357019 | A1 | 12/2018 | Karr | |
| 2019/0370012 | A1 | 12/2019 | Sears | |
| 2020/0105354 | A1* | 4/2020 | Helmick | G11C 16/22 |
| 2020/0185027 | A1 | 6/2020 | Rom | |

FOREIGN PATENT DOCUMENTS

TW   I376603   11/2012

OTHER PUBLICATIONS

Y.-H. Chang, J.-W. Hsieh and T.-W. Kuo, "Improving Flash Wear-Leveling by Proactively Moving Static Data," in IEEE Transactions on Computers, vol. 59, No. 1, pp. 53-65, Jan. 2010, doi: 10.1109/TC.2009.134. (Year: 2010).*

* cited by examiner

*Primary Examiner* — Kalpit Parikh
(74) *Attorney, Agent, or Firm* — Winston Hsu

(57) ABSTRACT

The present invention provides a memory controller configured to access a plurality of channels, wherein each of the channels includes a plurality flash memory chips, and the memory controller includes a flash translation layer and a plurality of control modules. The flash translation layer is configured to generate commands with corresponding physical addresses of at least one of the channels. The plurality of control modules are connected to the plurality of channels, respectively, and each of the control modules operates independently to receive the corresponding command with the corresponding physical address from the flash translation layer, to access the flash memory chips within the corresponding channels.

8 Claims, 3 Drawing Sheets

MEMORY CONTROLLER HAVING A PLURALITY OF CONTROL MODULES AND ASSOCIATED SERVER

BACKGROUND OF THE INVENTION

1. Field of the Invention

The present invention is related to memory control, and more particularly, to a control method and a control circuit for an all flash array (AFA) server.

2. Description of the Prior Art

Flash memories have been widely applied to various data storage device such as solid state drives (SSDs), and a server named AFA server may contain only the SSDs instead of spinning-disk drives. In the AFA server, each SSD contains multiple flash memory chips, and each flash memory chip needs a fixed busy time during a read/write operation, that is, the flash memory chip cannot perform another read or write operation during the busy time. Therefore, if the AFA server needs to perform a large number of read/write operations on the SSD in a short time, the read/write operations will be delayed due to the influence of the above-mentioned busy time. In addition, with the update of Peripheral Component Interconnect Express (PCIe) version, the demand for transfer rate from the host device is also getting higher, and the number of read/write commands from the host device may also increase significantly. Therefore, how to efficiently access the SSD is an important topic.

SUMMARY OF THE INVENTION

It is therefore an objective of the present invention to provide a new architecture of a memory controller within the AFA server, to solve the above-mentioned problems.

According to one embodiment of the present invention, a memory controller configured to access a plurality of channels is disclosed, wherein each of the channels comprises a plurality flash memory chips, and the memory controller comprises a flash translation layer and a plurality of control modules. The flash translation layer is configured to generate commands with corresponding physical addresses of at least one of the channels. The plurality of control modules are connected to the plurality of channels, respectively, and each of the control modules operates independently to receive the corresponding command with the corresponding physical address from the flash translation layer, to access the flash memory chips within the corresponding channels.

According to another embodiment of the present invention, a server comprising a network module, a processor, a plurality of channels and a memory controller is disclosed. The network module is configured to connect client device(s) via network. The processor is configured to control operations of the server. Each of the channels comprises a plurality flash memory chips. The memory controller is coupled between the processor and the plurality of channels, and the memory controller comprises a flash translation layer and a plurality of control modules. The flash translation layer is configured to generate commands with corresponding physical addresses of at least one of the channels. The plurality of control modules are connected to the plurality of channels, respectively, and each of the control modules operates independently to receive the corresponding command with the corresponding physical address from the flash translation layer, to access the flash memory chips within the corresponding channels.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
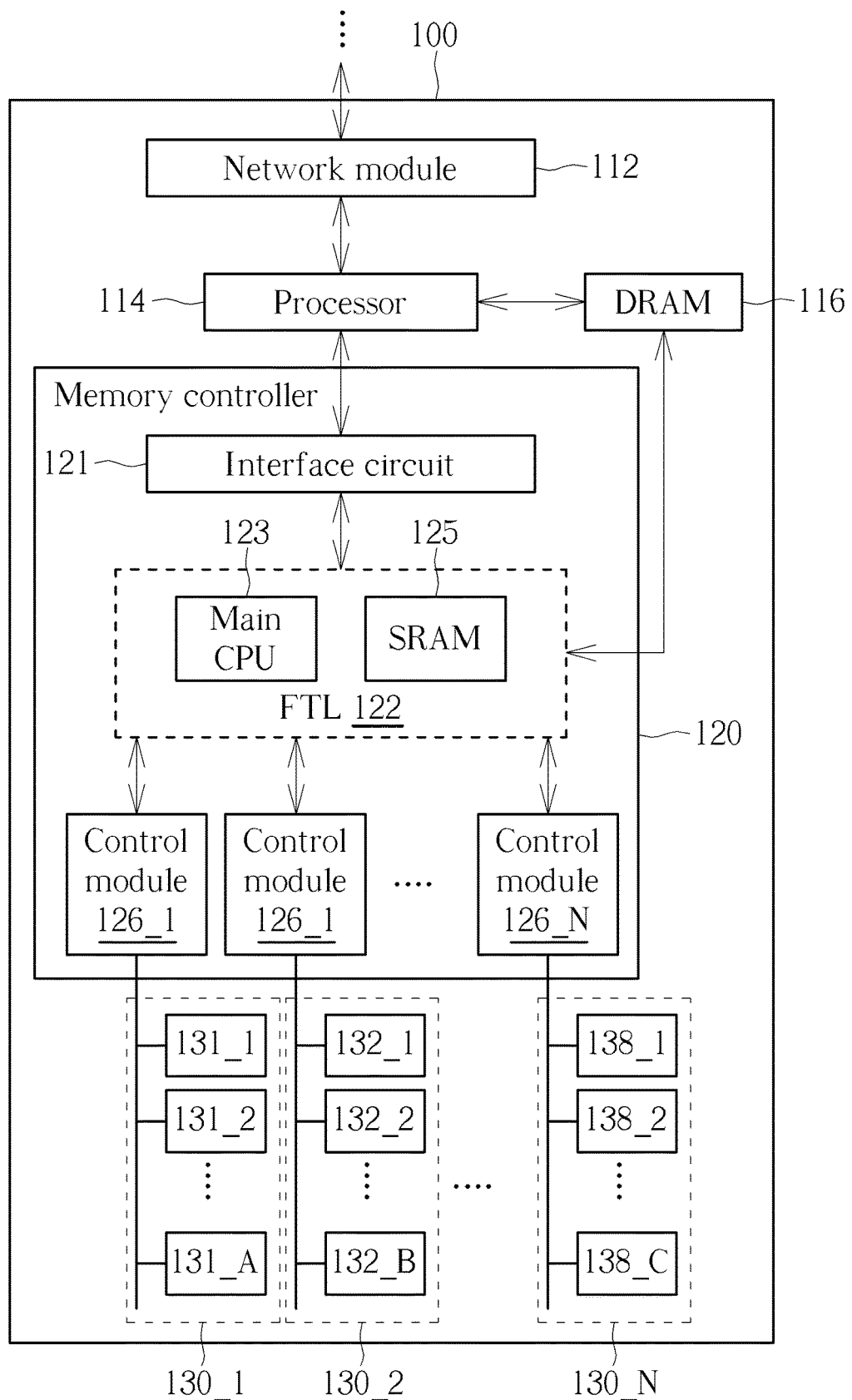
FIG. 1 is a diagram illustrating a server according to one embodiment of the present invention.

FIG. 1 is a diagram illustrating a server 100 according to one embodiment of the present invention, wherein the server 100 is an AFA server. As shown in FIG. 1, the server 100 comprises a network module 112, a processor 114, a dynamic random access memory (DRAM) 116, memory controller 120 and a plurality of channels 130_1-130_N, where 'N' may be any positive integer equal to or greater than two. The memory controller 120 comprises an interface circuit 121, a flash translation layer (FTL) 122 and a plurality of control modules 126_1-126_N, wherein the FTL 122 comprises a main central processing unit (CPU) 123 and a static random access memory (SRAM) 125. The channels 130_1-130_N are connected to the control modules 126_1-126_N, respectively, and each channel comprises a plurality of flash memory chips. For example, the channel 130_1 comprises the flash memory chips 131_1-131_A, the channel 130_2 comprises the flash memory chips 132_1-132B, the channel 130_N comprises the flash memory chips 138_1-138_C. In addition, each of the channels 130_1-130_N may be regarded as a pluggable solid state drive (SSD).

Figure 2:
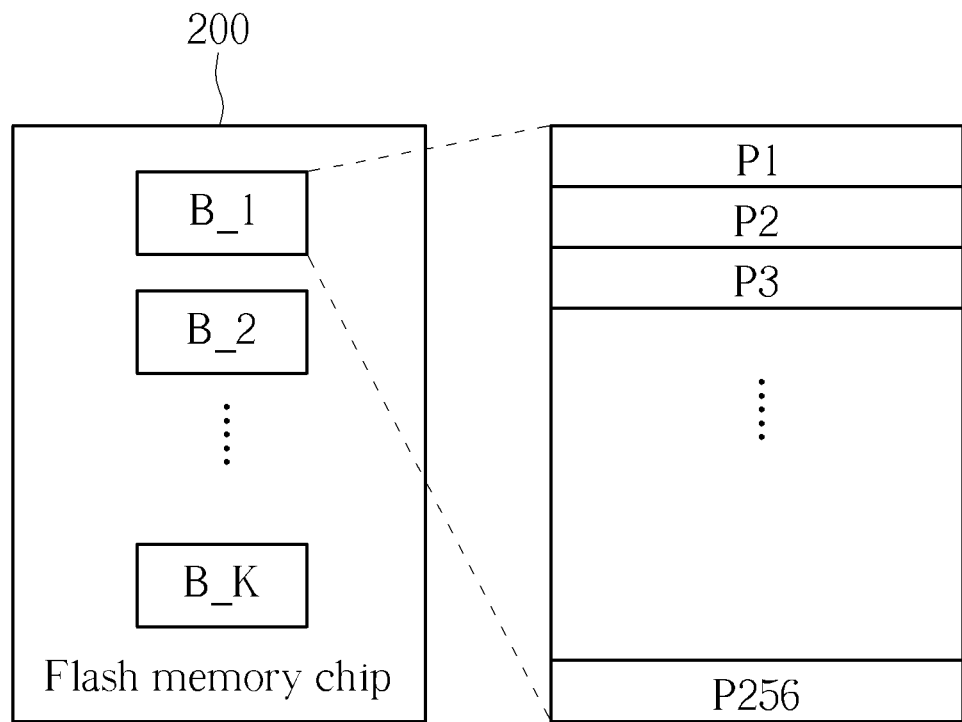
FIG. 2 shows a flash memory chip according to one embodiment of the present invention.

FIG. 2 shows a flash memory chip 200 according to one embodiment of the present invention, wherein the flash memory chip 200 may be used to implement each one of the flash memory chips 131_1-131_A, 132_1-132B and 138_1-138_C. As shown in FIG. 2, the flash memory chip 200 comprises a plurality of blocks B_1-B_K, wherein one block is a minimum erase unit of the flash memory chip 200, and each of the blocks B_1-B_K may have a single-level cell (SLC) array, a multi-level cell (MLC) array, a triple-level cell (TLC) array or a quad-level cell (QLC) array. Each block comprises a plurality of pages such as P1-P256, wherein one page is a minimum write unit of the flash memory chip 200. In addition, the blocks B_1-B_K within the flash memory chip 200 may be divided into several planes for the parallel operations.

The server 100 is configured to connect to at least one client device via Internet or Ethernet, and the network module 112 serves as an interface to receive data from the client devices and transmit data to the client devices. The processor 114 is configured to control the operations of the server 100. For example, when the processor 114 receives a read command from the client device, the processor 114 refers to a logical address within the read command to send a request to the memory controller 120 to ask for the data corresponding to the logical address of the read command, and the processor 114 sends the data read from at least one of the channels 130_1-130_N to the client device. In addition, when the processor 114 receives a write command and corresponding data from the client device, the data may be temporarily stored in the DRAM 116, and the processor 114 may perform compression and/or de-duplication operation on the data, then the processor 114 stores the data into at least one of the channels 130_1-130_N via the memory controller 120.

The memory controller 120 may be implemented by a single chip configured to perform the operations between the processor 114 of the server 100 and the channels 130_1-130_N. Regarding the elements within the memory controller 120, the interface circuit 121 is connected to the processor 114, and the interface circuit 121 may comply with Non-Volatile Memory Express (NVMe) specification and Peripheral Component Interconnect Express (PCIe) specification. The FTL 122 is configured to execute the operations such as basic mapping schemes, garbage collection, wear-leveling mechanism, block managements, and any other operation related to the managements of the channels 130_1-130_N. Specifically, logical address to physical address mapping tables (hereinafter, L2P tables) and/or physical address to logical address mapping tables (hereinafter, P2L table) are stored in the SRAM 125 or the DRAM 116, and the main CPU 123 can refer to the L2P tables or the P2L tables to perform the mapping schemes on the logical address within the read command to obtain the physical address of the channels 130_1-130_N, for getting the data from the 130_1-130_N. The SRAM 125 or the DRAM 116 may further store the health-related information for the garbage collection, the wear-leveling mechanism and/or the block managements, wherein the health-related information may comprise a read-count table recoding the read counts of each block, an erase-count table recording the erase counts of each block, a valid page table recording a number of valid pages within each block, a data retention table recording a write time of each block.

As described in the background of the present invention, with the update of PCIe version, the demand for transfer rate from the host device is also getting higher, and the number of read/write commands from the host device may also increase significantly. Therefore, the memory controller 120 designs multiple control modules 126_1-126_N respectively corresponding to the channels 130_1-130_N, and this internal parallelism makes the memory controller 120 capable of handling multiple incoming read/write commands in parallel and achieving a high bandwidth. Specifically, the main CPU 123 may have an arbiter that is configured to send the read/write commands and the related physical addresses of the channels to the control modules 126_1-126_N, and each of the control modules 126_1-126_N works independently and sends the response to the main CPU 123. For example, when the main CPU sends a first read command and a second read command to the control module 126_1 and the control module 126_2, respectively, the control module 126_1 refers to the physical address of the first read command to get the data from the channel 130_1 and send the data to the main CPU 123, and the control module 126_2 refers to the physical address of the second read command to get the data from the channel 130_2 and send the data to the main CPU 123. It is noted that the physical address that the control module 126_1-126_N receives indicate a chip number, a block number and a page number of the channel, that is the control module 126_1-126_N does not need to perform any address mapping mechanism.

Figure 3:
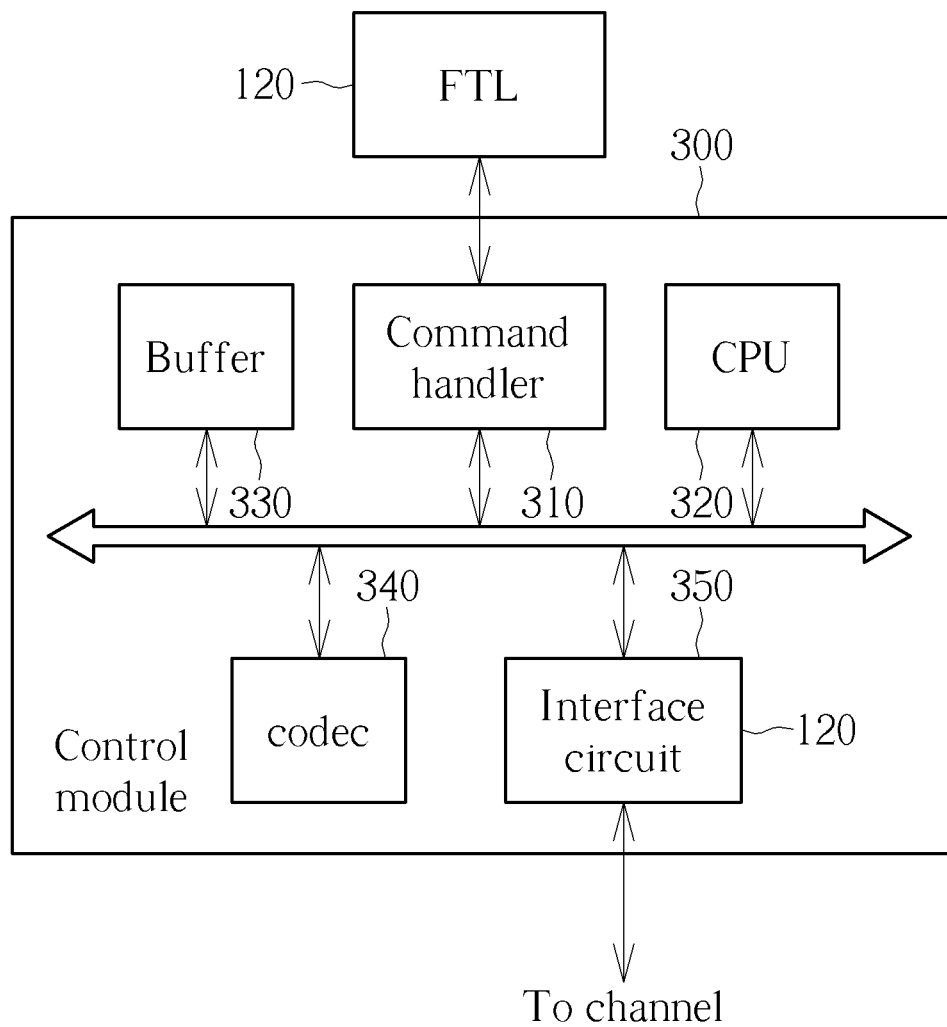
FIG. 3 shows a control module according to one embodiment of the present invention.

FIG. 3 shows a control module 300 according to one embodiment of the present invention, wherein the control module 300 can be used to implement each of the control modules 126_1-126_N shown in FIG. 1. As shown in FIG. 3, the control module 300 comprises a command handler 310, a CPU 320, a buffer 330, a codec 340 comprising an encoder and a decoder, and an interface circuit 350. The command handler 310 is configured to receive the commands from the FTL 122 and notifies the CPU 320 to perform the corresponding operations. Specifically, if the command handler 310 receives a read command with a corresponding physical address from the FTL 122, the CPU 320 may control the interface circuit 350 to ask for the data stored in the physical address of at least one of the channels 130_1-130_N; and after the interface circuit 350 gets the raw data from the at least one of the channels 130_1-130_N, the codec 340 decodes the raw data to generate decoded data, and the CPU 320 sends the decoded data to the FTL 120 via the command handler 310. If the command handler 310 receives a write command with a corresponding physical address and corresponding data from the FTL 122, the codec 340 encodes the data to generate encoded data, the CPU 320 may control the interface circuit 350 to write the encoded data into the physical address of at least one of the channels 130_1-130_N; and after the encoded data is successfully written into the at least one of the channels 130_1-130_N, the CPU 320 or the command handler 310 notifies the FTL 120 that the write command has been completed. If the command handler 310 receives an erase command with a corresponding physical block address (e.g., chip number and block number) from the FTL 122, the CPU 320 may control the interface circuit 350 to notify at least one of the channels 130_1-130_N to erase the block having the physical block address; and after the block is successfully erased, the CPU 320 or the command handler 310 notifies the FTL 120 that the erase command has been completed.

In one embodiment, the main CPU 123 of the FTL 122 is configured to perform event-driven operations, and the CPU 320 within the control module 300 is configured to perform timing-driven operations. In detail, because the FTL 122 has many tables related to the health of the blocks, such as the read-count table, the erase-count table, the valid page table and the data retention table, the main CPU 123 can refer to these tables to determine specific blocks that may have quality issue. For example, the main CPU 123 may determine that the block whose read count is higher than a threshold value may suffer a read disturbance issue, the main CPU 123 may determine that the block with valid pages lower than a threshold value should be performed the garbage collection operation, the main CPU 123 may determine that the block whose write time is earlier than a specific date may suffer a data retention issue; then the main CPU 123 may perform the garbage collection operation or a wear-level operation on these blocks to improve the data quality. In addition, the main CPU 123 can execute the garbage collection operation or the wear-level operation by sending the read commands (garbage collection read commands) and write commands (garbage collection write commands) to at least one of the control modules 126_1-126_N, and the control modules 126_1-126_N executes the read/write commands.

The control module 300 may periodically scan the blocks within the corresponding channels to determine if any block has a quality issue, wherein the period may be several minutes or any other appropriate time. In detail, the control module 300 may read some pages within a block to determine if the block has poor quality, wherein the codec 340 may decode the data read from the pages to obtain the decoding information such as error bit count or decoding time, and the CPU 320 can determine that the block has poor quality if the error bit count is higher than a threshold or the decoding time is longer than predetermined time. In addition, after the control module 300 determines the health information by periodically scanning the blocks, the CPU 320 may actively process these blocks with worse quality, or the CPU 320 may send the health information to the FTL 120. Specifically, if the control module 300 determines that three blocks of the corresponding channels have worse quality, the CPU 320 may actively move the data of these three blocks to blank blocks, respectively, without notifying the FTL 122; and after the data is successfully moved, the CPU 320 establishes the address mapping table of data within the old blocks (i.e. the above three blocks with worse quality) and the new blocks (i.e. the above blank blocks for storing data from the old blocks), and the address mapping table is sent to the FTL 120 for updating the P2L table or the L2P table stored in the SRAM 125 or the DRAM 116; and only when the main CPU 123 successfully updates the P2L table or the L2P table by using the address mapping table generated by the control module 300, the old blocks are allowed to be erased. In another example, if the control module 300 determines that three blocks of the corresponding channels have worse quality, the CPU 320 may directly send the health information to the FTL 122, for the main CPU 123 to establish a table recording the blocks having the worse quality; and the main CPU 123 can prioritize garbage collection operation on these blocks.

In light of above, by designing multiple control modules 126_1-126_N within the memory controller 120 to handle the access of the channels 130_1-130_N, respectively, the memory controller 120 can efficiently handle a large number of read/write commands. In addition, by configuring the main CPU 123 to execute the event-driven operations and configuring the control modules 126_1-126_N to execute the timing-driven operations, the main CPU 123 can be more efficient in execution and simpler in design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory controller configured to access a plurality of channels, wherein each of the channels comprises a plurality of flash memory chips, and the memory controller comprises:
   a flash translation layer, configured to generate commands with corresponding physical addresses of at least one of the channels; and
   a plurality of control modules, coupled to the flash translation layer, wherein the control modules are connected to the plurality of channels, respectively, and each of the control modules operates independently to receive the corresponding command with the corresponding physical address from the flash translation layer, to access the flash memory chips within the corresponding channels;
   wherein each of the control modules comprises:
   a command handler, configured to receive the corresponding command with the physical address from the flash translation layer;
   a central processing unit, configured to control the operations of the control module;
   a codec, configured to encode data from the flash translation layer and decode data read from the corresponding channel; and
   an interface circuit, coupled to the corresponding channel;
   wherein the flash translation layer comprises a main central processing unit, the main central processing unit is configured to perform event-driven operations, and the central processing unit of each of the control modules is configured to perform timing-driven operations;
   wherein the main central processing unit refers to at least one table related to health of blocks of the flash memory chips of the channels to determine first specific blocks having quality issue, and the main central processing unit performs a garbage collection operation on the first specific blocks by sending write commands and read commands to at least one of the control modules; and the central processing unit of each of the control modules periodically scans blocks within the corresponding channels to determine second specific blocks having quality issue;
   wherein after the central processing unit of each of the control modules periodically scans blocks within the corresponding channels to determine second specific blocks having quality issue, the central processing unit actively moves data within the second specific blocks to at least one new block, and establishes an address mapping table of the second specific blocks and the at least one new block; and the central processing unit further sends the address mapping table to the main central processing unit, for the main central processing unit to update a logical address to physical address mapping table or a physical address to logical address mapping table.

2. The memory controller of claim 1, wherein the physical address generated by the flash translation layer comprises at least a chip number and a block number of one of the channels, and each of the control modules directly uses the physical address to access the flash memory chip within the corresponding channels, without performing any logical address to physical address mapping operation.

3. The memory controller of claim 1, wherein when the flash translation layer generates a read command with the corresponding physical address to one of the control modules, the central processing unit refers to the corresponding physical address to read raw data from the corresponding channel, the codec decodes the raw data to generate decoded data, and the central processing unit or the command handler transmits the decoded data to the flash translation layer; and when the flash translation layer generates a write command with the corresponding data and physical address to one of the control modules, the codec encodes the data to generate encoded data, the central processing unit refers to the corresponding physical address to write the encoded data into the corresponding channel.

4. The memory controller of claim 1, wherein the main central processing unit does not perform the timing-driven operations to control the control modules to periodically scan the blocks within the corresponding channels.

5. A server, comprising:
- a network module, configured to connect client device(s) via network;
- a processor, configured to control operations of the server;
- a plurality of channels, wherein each of the channels comprises a plurality flash memory chips; and
- a memory controller, coupled between the processor and the plurality of channels, wherein the memory controller comprises:
  - a flash translation layer, configured to generate commands with corresponding physical addresses of at least one of the channels; and
  - a plurality of control modules, coupled to the flash translation layer, wherein the control modules are connected to the plurality of channels, respectively, and each of the control modules operates independently to receive the corresponding command with the corresponding physical address from the flash translation layer, to access the flash memory chips within the corresponding channels;
  - wherein each of the control modules comprises:
    - a command handler, configured to receive the corresponding command with the physical address from the flash translation layer;
    - a central processing unit, configured to control the operations of the control module;
    - a codec, configured to encode data from the flash translation layer and decode data read from the corresponding channel; and
    - an interface circuit, coupled to the corresponding channel;
  - wherein the flash translation layer comprises a main central processing unit, the main central processing unit is configured to perform event-driven operations, and the central processing unit of each of the control modules is configured to perform timing-driven operations;
  - wherein the main central processing unit refers to at least one table related to health of blocks of the flash memory chips of the channels to determine first specific blocks having quality issue, and the main central processing unit performs a garbage collection operation on the first specific blocks by sending write commands and read commands to at least one of the control modules; and the central processing unit of each of the control modules periodically scans blocks within the corresponding channels to determine second specific blocks having quality issue;
  - wherein after the central processing unit of each of the control modules periodically scans blocks within the corresponding channels to determine second specific blocks having quality issue, the central processing unit actively moves data within the second specific blocks to at least one new block, and establishes an address mapping table of the second specific blocks and the at least one new block; and the central processing unit further sends the address mapping table to the main central processing unit, for the main central processing unit to update a logical address to physical address mapping table or a physical address to logical address mapping table.

6. The server of claim 5, wherein the physical address generated by the flash translation layer comprises at least a chip number and a block number of one of the channels, and each of the control modules directly uses the physical address to access the flash memory chip within the corresponding channels, without performing any logical address to physical address mapping operation.

7. The server of claim 5, wherein when the flash translation layer generates a read command with the corresponding physical address to one of the control modules, the central processing unit refers to the corresponding physical address to read raw data from the corresponding channel, the codec decodes the raw data to generate decoded data, and the central processing unit or the command handler transmits the decoded data to the flash translation layer; and when the flash translation layer generates a write command with the corresponding data and physical address to one of the control modules, the codec encodes the data to generate encoded data, the central processing unit refers to the corresponding physical address to write the encoded data into the corresponding channel.

8. The server of claim 5, wherein the main central processing unit does not perform the timing-driven operations to control the control modules to periodically scan the blocks within the corresponding channels.

* * * * *